United States Patent
Maeda et al.

(10) Patent No.: US 12,050,302 B2
(45) Date of Patent: Jul. 30, 2024

(54) INSPECTION APPARATUS AND INSPECTION PROGRAM

(71) Applicants: KABUSHIKI KAISHA TOSHIBA, Tokyo (JP); Toshiba Infrastructure Systems & Solutions Corporation, Kawasaki (JP)

(72) Inventors: Masaya Maeda, Kawasaki (JP); Akihisa Takada, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 424 days.

(21) Appl. No.: 17/457,760

(22) Filed: Dec. 6, 2021

(65) Prior Publication Data
US 2022/0091296 A1    Mar. 24, 2022

Related U.S. Application Data

(63) Continuation of application No. PCT/JP2020/020126, filed on May 21, 2020.

(30) Foreign Application Priority Data

Jun. 6, 2019    (JP) .................... 2019-106275

(51) Int. Cl.
*G01V 5/22*    (2024.01)
*B07C 5/34*    (2006.01)
(Continued)

(52) U.S. Cl.
CPC .............. *G01V 5/22* (2024.01); *B07C 5/3412* (2013.01); *B07C 5/3416* (2013.01); *B07C 5/361* (2013.01); *B07C 5/38* (2013.01); *G01V 5/271* (2024.01)

(58) Field of Classification Search
CPC ........ G01V 5/22; G01V 5/271; B07C 5/3412; B07C 5/3416; B07C 5/361; B07C 5/38
(Continued)

(56) References Cited

U.S. PATENT DOCUMENTS

| | | | |
|---|---|---|---|
| 6,189,702 B1 * | 2/2001 | Bonnet | B65G 47/82 198/748 |
| 2009/0174554 A1 * | 7/2009 | Bergeron | G01N 23/04 340/568.1 |
| 2010/0057247 A1 * | 3/2010 | Frankenberg | B07C 3/00 209/552 |

FOREIGN PATENT DOCUMENTS

| | | | |
|---|---|---|---|
| CA | 3142298 A1 * | 12/2020 | B07C 3/00 |
| EP | 3 273 394 A1 | 1/2018 | |

(Continued)

OTHER PUBLICATIONS

International Search Report issued Jul. 14, 2020 in PCT/JP2020/020126, filed on May 21, 2020, 2 pages.
(Continued)

*Primary Examiner* — Terrell H Matthews
(74) *Attorney, Agent, or Firm* — Maier & Maier, PLLC

(57) ABSTRACT

According to an embodiment, an inspection apparatus includes a communication interface and a processor. The communication interface acquires results of single-item determination, which are inspection results for individual parcels that are successively conveyed, and number-of-items information for identifying, as one parcel group, a plurality of parcels among the individual parcels. The processor identifies a plurality of parcels as one parcel group, based on the number-of-items information, determines a result of multiple-item determination, which is an inspection result for the parcel group, based on the results of the single-item determination for the individual parcels included in the parcel group, and distributes the individual parcels included (Continued)

in the parcel group, based on the result of the multiple-item determination.

6 Claims, 12 Drawing Sheets

(51) Int. Cl.
*B07C 5/36* (2006.01)
*B07C 5/38* (2006.01)
*G01V 5/20* (2024.01)

(58) Field of Classification Search
USPC .......................................................... 209/584
See application file for complete search history.

(56) References Cited

FOREIGN PATENT DOCUMENTS

| EP | 3273394 A1 * | 1/2018 | ............. G06Q 10/08 |
|----|---|---|---|
| EP | 3968249 A1 * | 3/2022 | ............... B07C 3/00 |
| JP | 2001-233440 A | 8/2001 | |
| JP | 2002-257751 A | 9/2002 | |
| JP | 2002257751 A * | 9/2002 | ........... G01V 5/0008 |
| JP | 3387760 B2 | 3/2003 | |
| JP | 2010-26757 A | 2/2010 | |
| JP | 2018-5491 A | 1/2018 | |
| JP | 2018-13939 A | 1/2018 | |

OTHER PUBLICATIONS

Office Action issued on Jan. 25, 2023, in corresponding Canadian Application No. 3,142,298, 5 pages.

* cited by examiner

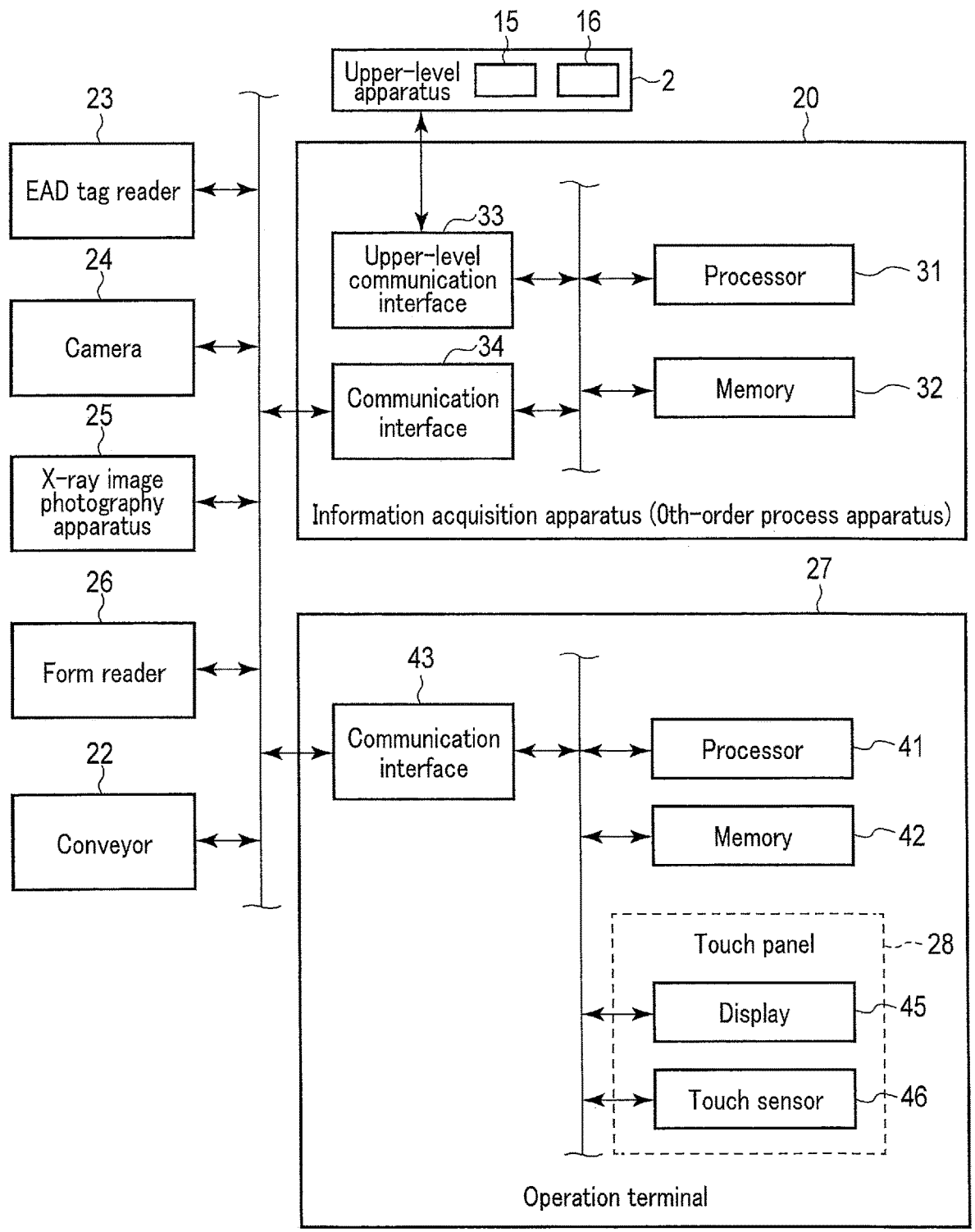
F I G. 4

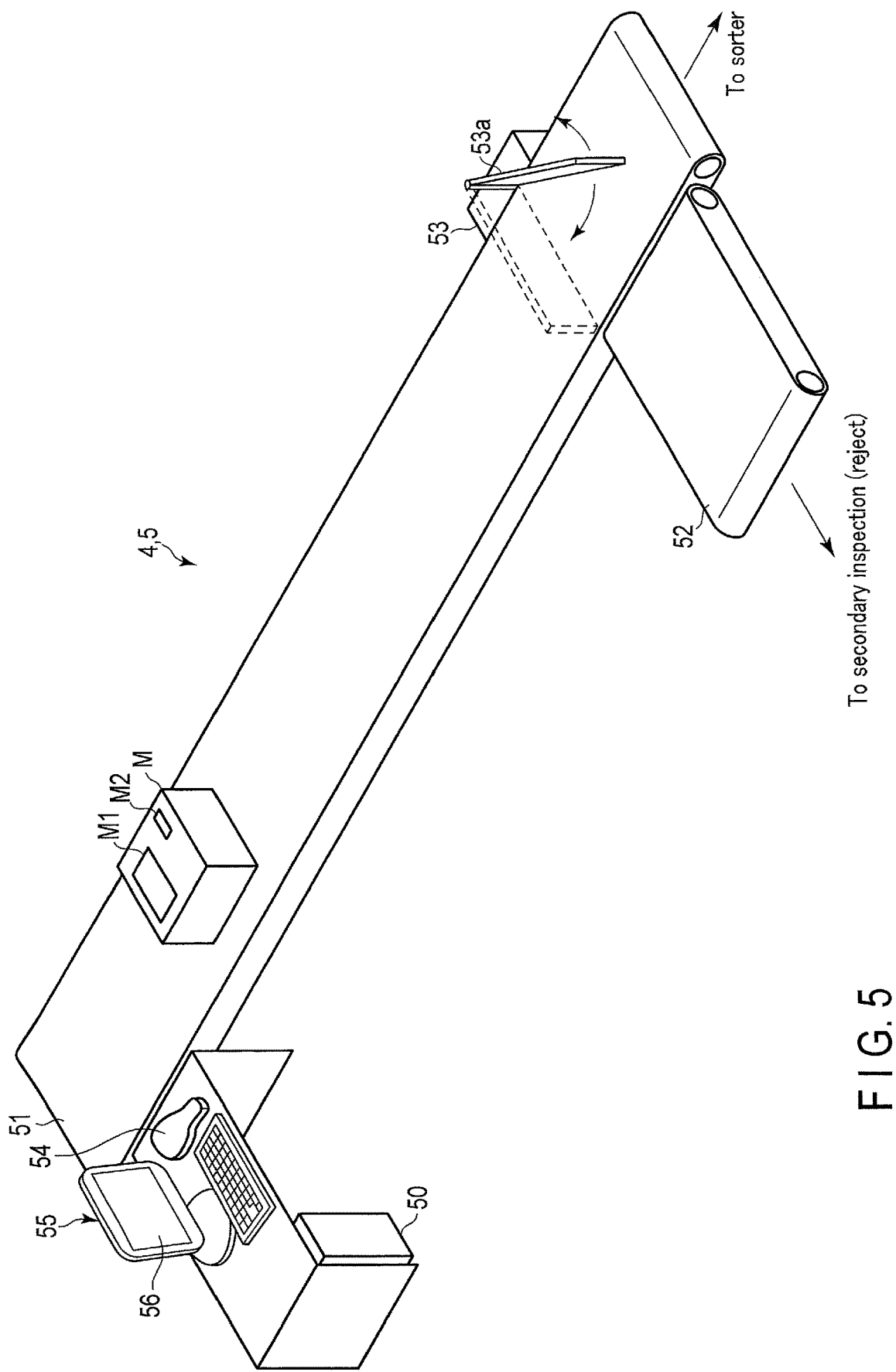
F I G. 5

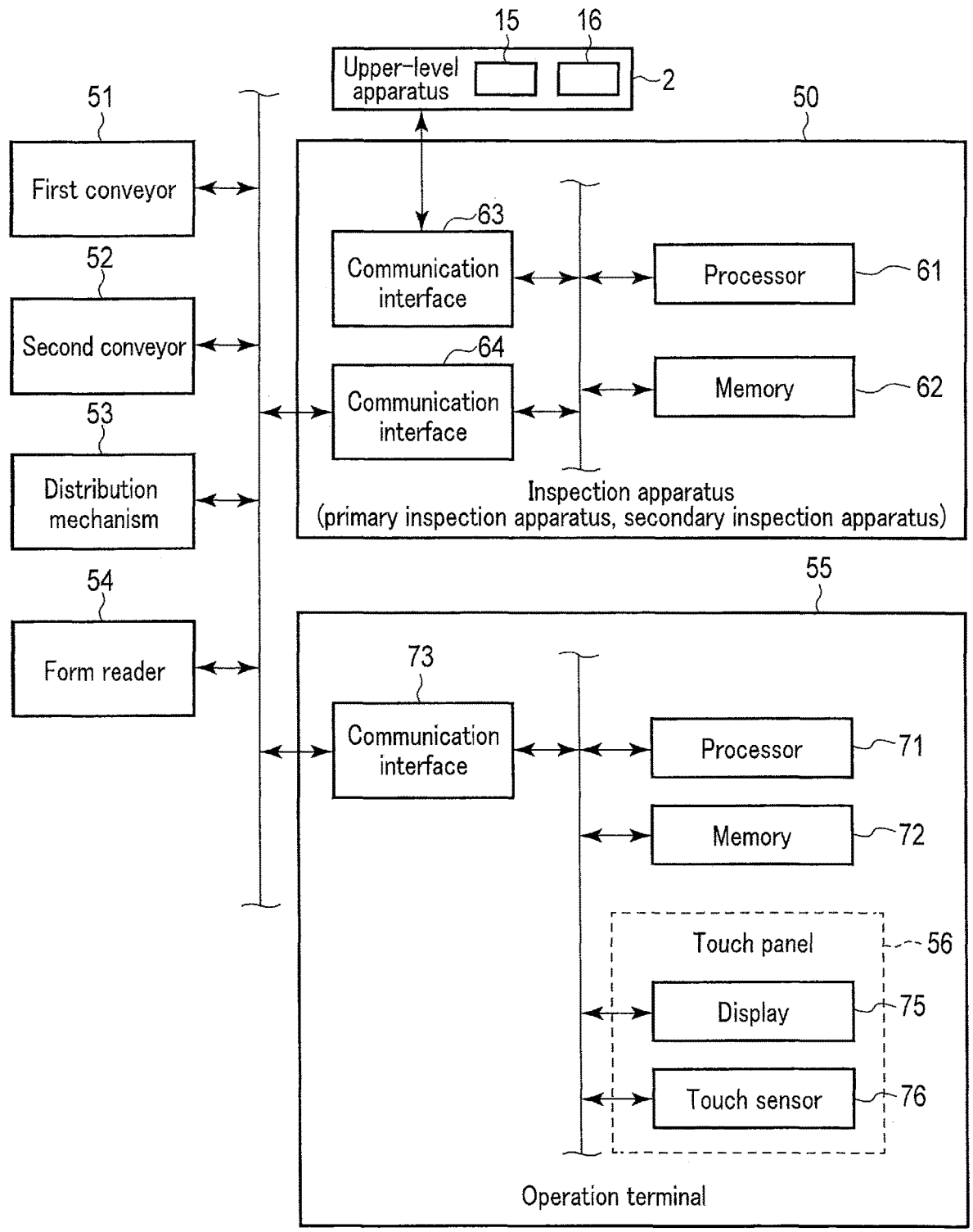
F I G. 6

| Multiple-item-group ID | Parcel ID | Form information | X-ray image | External appearance image |
|---|---|---|---|---|
| 061212_3 | 00001 | aaa | 0001_x.xxx | 0001_s.yyy |
| 061212_3 | 00002 | aaa | 0002_x.xxx | 0002_s.yyy |
| 061212_3 | 00003 | aaa | 0003_x.xxx | 0003_s.yyy |

FIG. 9

| Multiple-item-group ID | Parcel ID | Form information | X-ray image | External appearance image | Single-item determination | Multiple-item determination | Destination of distribution |
|---|---|---|---|---|---|---|---|
| 061212_3 | 00001 | aaa | 0001_x.xxx | 0001_s.yyy | Normal | Dangerous article | 2 |
| 061212_3 | 00002 | aaa | 0002_x.xxx | 0002_s.yyy | Normal | Dangerous article | 2 |
| 061212_3 | 00003 | aaa | 0003_x.xxx | 0003_s.yyy | Dangerous article | Dangerous article | 2 |

F I G. 12

INSPECTION APPARATUS AND INSPECTION PROGRAM

CROSS-REFERENCE TO RELATED APPLICATIONS

This application is a Continuation Application of PCT Application No. PCT/JP2020/020126, filed May 21, 2020 and based upon and claiming the benefit of priority from Japanese Patent Application No. 2019-106275, filed Jun. 6, 2019, the entire contents of all of which are incorporated herein by reference.

FIELD

Embodiments of the present invention relate to an inspection apparatus and an inspection program.

BACKGROUND

Conventionally, there is known an inspection system in which an operator confirms an image of an external appearance (external appearance image) and a photograph image by X-rays (X-ray image) of an article, and the article is sorted based on the confirmation result of the operator. Articles that are inspection targets of the inspection system are, for example, parcels packed in boxes. The operator performs an operation input for classifying the parcels into a parcel that requires an inspection of the next stage, and a parcel that does not require the inspection, based on the external appearance images and X-ray images. Based on the operator's operation input, the inspection system sorts the parcels into a parcel that requires an inspection of the next stage, and a parcel that does not require the inspection.

However, since the conventional inspection system presupposed that each of articles is individually inspected and sorted, it is difficult to sort a plurality of articles, which form one set, as a group. In the conventional inspection system, when only a part of an article group, which is one set of articles, requires an inspection of the next stage, the articles of the article group are separated and classified into an article requiring an inspection and an article not requiring the inspection. For example, a plurality of parcels (delivery articles), which form one set, should finally be managed as one set for reasons of delivery or the like. Thus, in the conventional inspection system, when one set of parcels are separately sorted into a parcel for which the inspection in the next stage was performed, and a parcel which did not require the inspection, a work for gathering the one set of parcels once again is needed.

CITATION LIST

Patent document 1: Jpn. Pat. Appln. KOKAI Publication No. 2018-13939

SUMMARY

Technical Problem

The object of the present invention is to provide an inspection apparatus and an inspection program, which can distribute, as one group, a plurality of articles which are individually inspected.

Solution to Problem

According to an embodiment, an inspection apparatus includes a communication interface and a processor. The communication interface acquires results of single-item determination, which are inspection results for individual parcels that are successively conveyed, and number-of-items information for identifying, as one parcel group, a plurality of parcels among the individual parcels. The processor configured to identifies a plurality of parcels as one parcel group, based on the number-of-items information, determines a result of multiple-item determination, which is an inspection result for the parcel group, based on the results of the single-item determination for the individual parcels included in the parcel group, and distributes the individual parcels included in the parcel group, based on the result of the multiple-item determination.

BRIEF DESCRIPTION OF THE DRAWINGS

FIG. 4 is a block diagram illustrating a configuration example of a control system of the 0th-order process system in the inspection system according to the embodiment.

FIG. 5 is a view illustrating a configuration example of a primary inspection system and a secondary inspection system in the inspection system according to the embodiment.

FIG. 6 is a block diagram illustrating a configuration example of a control system of the primary inspection system and the secondary inspection system in the inspection system according to the embodiment.

FIG. 9 is a view illustrating an example of a database generated by information which the 0th-order process system of the inspection system according to the embodiment collects.

FIG. 12 is a view illustrating an example of a database in which information is registered by the primary inspection process of the inspection system according to the embodiment.

DETAILED DESCRIPTION

Hereinafter, embodiments will be described with reference to the accompanying drawings.

Figure 1:
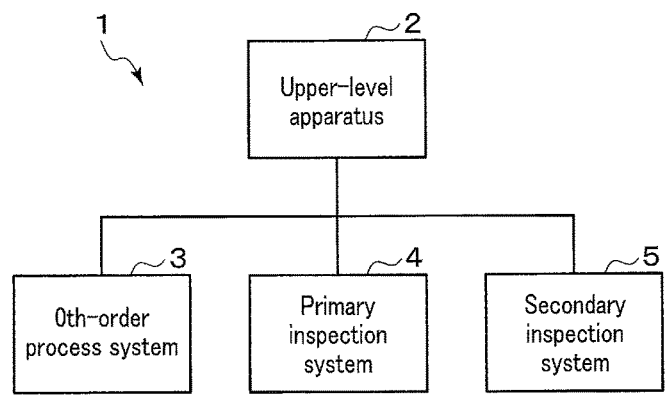
FIG. 1 is a block diagram schematically illustrating a whole configuration of an inspection system according to an embodiment.

FIG. 1 is an explanatory view for describing a schematic configuration example of an inspection system 1 according to an embodiment.

The inspection system 1 is a system for inspecting articles such as parcels, which are inspection targets. The inspection system 1 performs an inspection for discovering, for example, an article including a controlled item or a taxable item, and an article (parcel) of a specific sender or a specific receiver. For example, it is assumed that the controlled items are an article, the import of which to the country is controlled, an article, the export of which to foreign countries is controlled, and the like. Note that it is assumed that the controlled items, the import of which to the country is controlled and the export of which to foreign countries is controlled, are, for instance, arms, drugs, animals, plants, and the like.

In the inspection system 1 according to the present embodiment, the articles that are inspection targets are not limited to parcels. However, in the following description, it is assumed that the articles are parcels. A form and a tag are attached to a parcel that is an article of the inspection target. Examples of the form include an address form indicative of a sender and a receiver of the parcel, and an article content application form indicative of the content. The tag is information indicative of identification information allocated to the parcel, and a bar code, in which identification information is coded, may be printed on the tag, or the tag may be an RFID (Radio Frequency Identifier) tag which stores identification information allocated to the parcel or stores an inspection result by another inspection organization or the like. However, depending on a parcel that is the inspection target, there is a case in which the tag is not attached to the parcel.

In the configuration example illustrated in FIG. 1, the inspection system 1 includes an upper-level apparatus 2, a 0th-order process system 3, a primary inspection system 4, and a secondary inspection system 5.

The upper-level apparatus 2 is an information management apparatus for managing information in the inspection system 1. The upper-level apparatus 2 manages information relating to parcels that are inspection targets. For example, the upper-level apparatus 2 stores, in a database, advance data that is information relating to parcels to be inspected, and updates the database storing the information including inspection results relating to the parcels, based on the information acquired from the respective systems 3, 4 and 5.

The 0th-order process system 3 is an information acquisition system which acquires information for inspecting parcels. The 0th-order process system 3 acquires various kinds of information from parcels which are conveyed by a conveyor, and registers the acquired information in the database provided in the upper-level apparatus 2. For example, the 0th-order process system 3 acquires, from each parcel, tag information, form information, an external appearance image, and an X-ray image. The 0th-order process system 3 correlates, and registers in the database, the tag information, form information, external appearance image and X-ray image acquired from each parcel, and identification information (ID) allocated to each parcel or acquired from each parcel.

The primary inspection system 4 is a system which inspects each parcel, based on the information registered by the 0th-order process system. The primary inspection system 4 presents to an operator the information acquired by the 0th-order process with respect to each parcel, and accepts an input of an inspection result of the parcel by the operator. For example, the primary inspection system 4 displays, on a display device, the tag information, form information, external appearance image and X-ray image acquired from the parcel that is the inspection target. The operator visually recognizes the displayed information, and classifies the parcels into a parcel that requires a secondary inspection and a parcel that does not require the secondary inspection.

For example, the operator determines that a parcel, which is suspected to include a controlled item, requires the secondary inspection, and inputs, by an operation terminal, the determination result that the secondary inspection is necessary. In addition, also when information that requires a secondary inspection is included in the information described in the form, such as the sender information, receiver (address) information, article content, or the like, the operator determines that the secondary inspection is necessary, and inputs, by the operation terminal, the determination result that the secondary inspection is necessary. Besides, when the operator determines that the parcel is a normal article (the inspection is passed), the operator inputs, by the operation terminal, the determination result that the inspection result for the parcel is normal.

A parcel, which was determined to require the secondary inspection in the primary inspection system 4, is sent to a secondary inspection site where the secondary inspection system 5 is installed. In addition, a parcel, which was determined to be normal in the primary inspection system 4, is sent to a site for processing the parcel that was determined to be normal. Note that, in the present embodiment, it is assumed that the parcel determined to be normal in the primary inspection system 4 or secondary inspection system 5 is sent to an address sorting apparatus (hereinafter, also referred to simply as "sorter") which sorts the parcel according to the address described on the form.

The secondary inspection system 5 inspects in detail the parcel that was determined to require the secondary inspection in the primary processing system. For example, in the secondary inspection system 5, the operator unpacks the parcel and inspects the content of the parcel in detail. The secondary inspection system 5 displays the result of the primary inspection in the primary inspection system 4 and the information acquired in the 0th-order process, and accepts an input of information indicative of the result of the detailed inspection of the unpacked parcel by the operator.

For example, in the secondary inspection system 5, when it is confirmed that a controlled item is included in the parcel, the operator inputs, by the operation terminal, the confirmation result that the article is a parcel that is to be rejected. In addition, when the operator confirmed, as the inspection result of the unpacked parcel, that the parcel does not include a controlled item and is a normal parcel, the operator inputs, by the operation terminal, the confirmation result that the inspection result for the parcel is normal.

Next, the configuration of the upper-level apparatus 2 will be described.

Figure 2:
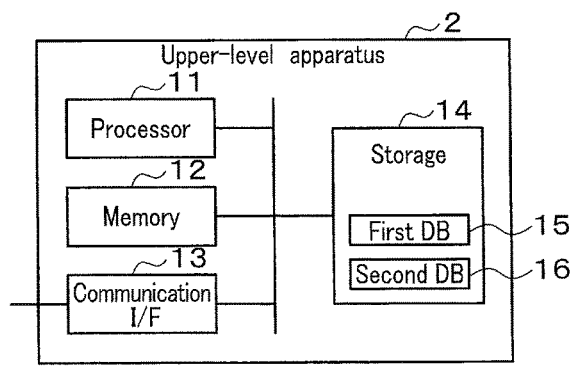
FIG. 2 is a block diagram illustrating a configuration example of an upper-level apparatus in the inspection system according to the embodiment.

FIG. 2 is a block diagram illustrating a configuration example of the upper-level apparatus 2.

The upper-level apparatus 2 is an information management apparatus which manages the information of the entirety of the inspection system 1. The upper-level apparatus 2 is a computer that is communicably connected to the systems 3, 4 and 5. The upper-level apparatus 2 is composed of, for example, a server apparatus.

In the configuration example illustrated in FIG. 2, the upper-level apparatus 2 includes a processor 11, a memory 12, a communication interface 13, and a storage 14.

The processor 11 executes an arithmetic process. The processor 11 is composed as, for example, a CPU. The processor 11 implements various processes by executing programs stored in the memory 12.

The memory 12 is a storage device which stores programs and data. The memory 12 includes, for example, a ROM that is a read-only nonvolatile memory, a RAM that temporarily stores data, and a rewritable nonvolatile memory.

The processor 11 functions as a processing unit which executes various processes by executing, with use of the RAM, the programs stored in the ROM or nonvolatile memory in the memory 12.

The communication interface 13 is an interface for communicating with the 0th-order process system 3, primary inspection system 4 and secondary inspection system 5. The communication interface 13 may include communication interfaces for the systems 3, 4 and 5, respectively.

The storage 14 is a storage device including a rewritable nonvolatile memory. The storage 14 is composed of, for example, a hard disk drive (HDD), or a solid state drive (SSD). The storage 14 includes a first database 15 and a second database 16.

The first database 15 is a database which stores information (advance data) relating to parcels that are inspection targets. For example, the advance data stored in the first database 15 may be read from a storage medium such as a portable storage device, may be acquired via a communication line, or may be input by the operator.

The second database 16 is a database which stores information acquired from parcels that are inspection targets, and information indicative of inspection results or the like. For example, the second database 16 correlates and registers the advance data registered in the first database 15 and the information (tag information, external appearance image, X-ray image, and form information) acquired by the 0th-order process system 3, with the identification information. In addition, the information indicative of the inspection results by the primary inspection system 4 and secondary inspection system 5 is registered in the second database 16. Further, in the present embodiment, in order to manage a plurality of parcels that form one set (parcels of a multiple-item group), a multiple-item-group ID, which is allocated to each multiple-item group, is registered in the second database 16 for the respective parcels of the multiple-item group.

Next, a description will be given of a configuration of the 0th-order process system (information acquisition system) 3 according to the embodiment.

Figure 3:
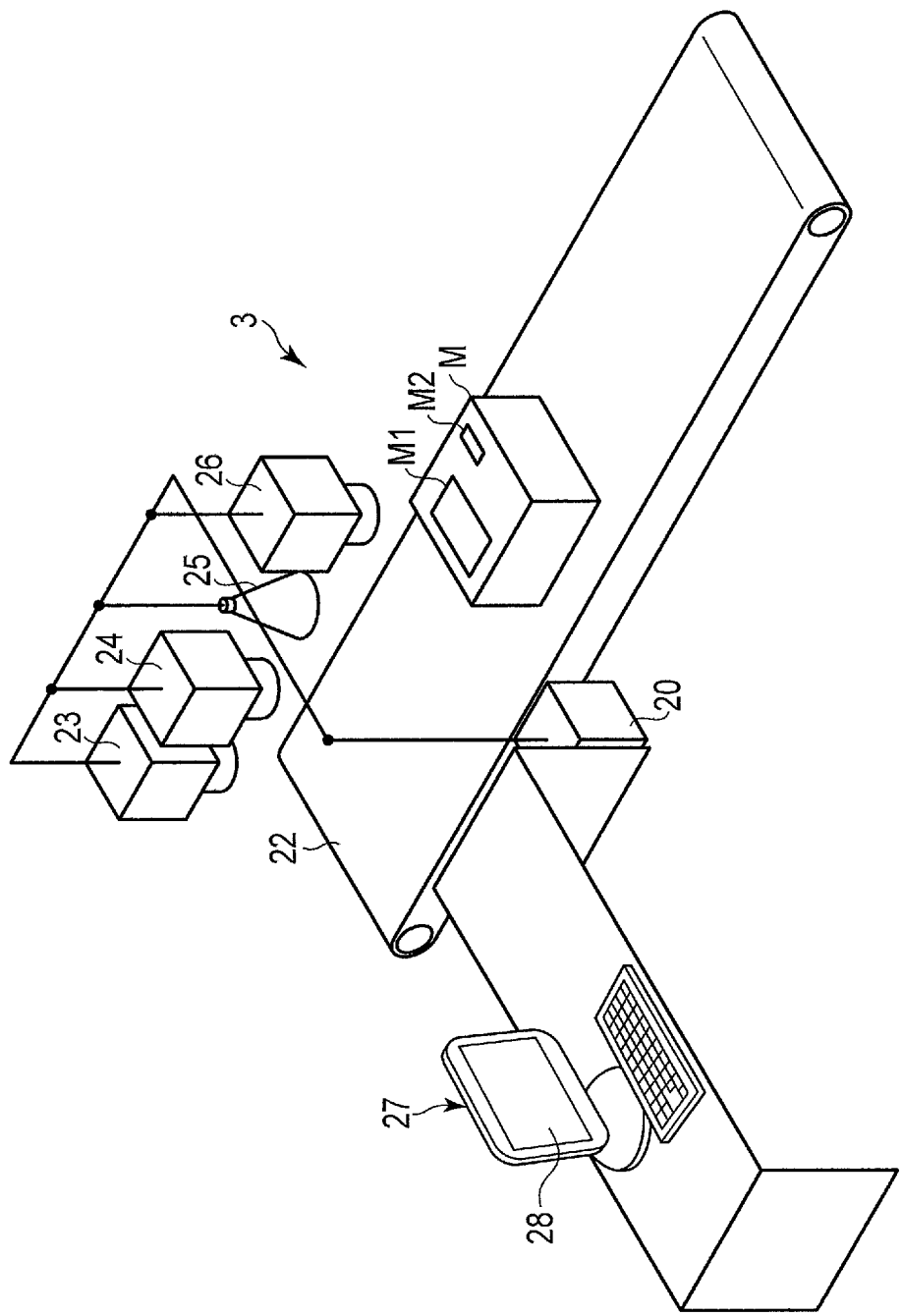
FIG. 3 is a view illustrating a configuration example of a 0th-order process system in the inspection system according to the embodiment.

FIG. 3 is a view schematically illustrating a configuration example of the 0th-order process system 3 according to the embodiment.

The 0th-order process system 3 includes an information acquisition apparatus (0th-order process apparatus) 20, a conveyor 22, a tag reader 23, a camera 24, an X-ray photography apparatus 25, a form reader 26, and an operation terminal 27. The information acquisition apparatus 20 is configured to be communicable with the conveyor 22, tag reader 23, camera 24, X-ray photography apparatus 25, form reader 26 and operation terminal 27.

As illustrated in FIG. 3, a form M1 and a tag M2 are attached to a parcel M that is an example of an article which is an inspection target of the inspection system 1. The form M1 includes, for example, a destination form indicative of a sender and a destination of the parcel, and an article content application form indicative of the content. The destination form describes destination information indicative of the address of the destination, receiver information indicative of the receiver, sender address information indicative of the address of the sender, and sender information indicative of the sender. The article content application form describes information indicative of an article included in the parcel M which the sender declares.

In addition, the tag M2 is indicative of the identification information allocated to the parcel M. For example, a bar code indicative of identification information may be printed on the tag M2, or the tag M2 may be an RFID (Radio Frequency Identifier) tag which stores identification information allocated to the parcel or stores an inspection result by another inspection organization or the like, and the tag M2 is attached to the surface of the parcel M. In the present embodiment, it is assumed that the bar code indicative of the identification information is printed on the tag M2. However, depending on the parcel M that is the inspection target, there is a case in which the tag M2 is not attached to the parcel M.

The tag M2 is, for example, an Electronic Advance Data (EAD) tag. The EAD tag is, for example, a tag on which an identification code (EAD identification code) included in EAD information that is an inspection result in the custom house of another country is printed. In this case, the tag M2 may be a tag on which identification information, such as an EAD identification code, is printed as a bar code. The EAD information is information including information (content information) or the like, which is indicative of an EAD identification code, address/name information, an item name and a weight of the content, and the like. The address/name information is, for example, information (receiver information) indicative of the receiver (destination) of the parcel M, and/or information (sender information) indicative of the sender.

The conveyor 22 is an apparatus which conveys the parcel M that is the inspection target. In the process (0th-order process) in the 0th-order process system 3, various kinds of information are acquired from the parcel M that is conveyed in a predetermined direction. Thus, the conveyor 22 conveys the parcel M such that the parcel M passes through positions where various kinds of devices acquire various kinds of information. Specifically, the conveyor 22 conveys the parcel M in a predetermined direction such that the parcel M passes through positions (photography positions) where the tag reader 23, camera 24, X-ray photography apparatus 25 and form reader 26 acquire information. In addition, the conveyor 22 moves the parcel M at such a conveyance speed that the tag reader 23, camera 24, X-ray photography apparatus 25 and form reader 26 can surely acquire information. Furthermore, the parcel M, which has been conveyed by the conveyor 22 and has passed through the photography positions of the tag reader 23, camera 24, X-ray photography apparatus 25 and form reader 26, is sent to the primary inspection system 4.

Note that an end portion on the upstream side of the conveyor 22 may be configured such that the parcel M is supplied by a robot arm or the like. In addition, an automated guided vehicle (AGV) or the like for sending the parcel M, for which the 0th-order process was finished, to the primary inspection system 4 may be disposed on an end portion on the downstream side of the conveyor 22.

The tag reader 23 reads the tag M2 from the parcel M that is being conveyed by the conveyor 22. It is assumed that the tag M2 includes identification information. For example, the tag M2 is an EAD tag. In this case, the tag reader 23 reads the EAD identification code from the EAD tag as the tag M2. The tag reader 23 reads the identification information from the tag M2, and supplies the read identification information to the information acquisition apparatus 20. For example, in such an operational implementation that the bar code indicative of the identification information is printed on the tag M2, the tag reader 23 is configured as a bar code reader.

The camera 24 acquires (captures) an image (an external appearance image, an exterior image) of the external appearance (exterior) of the parcel M that is conveyed by the conveyor 22. The camera 24 supplies the acquired external appearance image of the parcel M to the information acquisition apparatus 20. For example, the camera 24 is composed of a combination between a lens and an imaging element which converts light focused by the lens into an image. The camera 24 may be configured to capture the external appearance image, not only from an upward direction relative to the parcel M, but also from a direction other than the upward direction.

The X-ray photography apparatus 25 acquires an X-ray image of the parcel M that is conveyed by the conveyor 22. The X-ray photography apparatus 25 supplies the acquired X-ray image of the parcel M to the information acquisition apparatus 20. For example, the X-ray photography apparatus 25 is composed of a combination between an X-ray tube which radiates X-rays to the parcel M, and an X-ray detector which detects the X-rays that have passed through the parcel M. The X-ray photography apparatus 25 may be configured to radiate X-rays not only in one direction but also in multiple directions, thereby to capture a plurality of X-ray images.

The form reader 26 reads various kinds of information from the form M1 attached to the parcel M that is conveyed by the conveyor 22. For example, the form reader 26 acquires information, such as receiver information and sender information, from the address form of the form M1, and acquires information indicative of the content of the parcel from the article content application form of the form M1. It is assumed that the information read by the form reader 26 from the form M1 is called "form information". The form reader 26 supplies the form information, which is read from the form M1 attached to the parcel M, to the information acquisition apparatus 20.

For example, the form reader 26 includes a line image sensor. The line image sensor includes an imaging element in which pixels that convert light to an image are arranged in a line shape, and a lens which focuses light on the pixels, and the line image sensor acquires an image (form image) of the form M1. In addition, the form reader 26 includes a processor which executes an optical character recognition process of recognizing form information, such as the receiver information, sender information and the information of the content, from the form image read by the line image sensor.

The operation terminal 27 generates a signal (operation signal) corresponding to an operation input of the operator, and supplies the operation signal to the information acquisition apparatus 20. In addition, the operation terminal 27 includes a touch panel 28 functioning as a user interface. The touch panel 28 includes a display which provides various kinds of information to the operator, and a touch sensor which accepts an operation instruction that is input by the operator touching the screen.

Next, a description will be given of a configuration of a control system in the 0th-order process system (information acquisition system) 3 according to the embodiment.

FIG. 4 is a block diagram illustrating a configuration example of the control system of the 0th-order process system 3 according to the embodiment.

As illustrated in FIG. 4, the 0th-order process system 3 is configured such that the respective devices (conveyor 22, tag reader 23, camera 24, X-ray photography apparatus 25, form reader 26, and operation terminal 27) are connected to the information acquisition apparatus (0th-order process apparatus) 20.

The information acquisition apparatus 20 acquires various kinds of information from the parcel M that is the inspection target. The information acquisition apparatus 20 acquires the external appearance image, X-ray image, form information and tag information. The information acquisition apparatus 20 registers the acquired information in the database which the upper-level apparatus 2 manages. The information acquisition apparatus 20 is composed of an apparatus, such as a personal computer (PC), which can execute communication of data, processing of data, and storage of data.

As illustrated in FIG. 4, the information acquisition apparatus 20 includes a processor 31, a memory 32, an upper-level communication interface 33 and a communication interface 34.

The processor 31 executes an arithmetic process. The processor 31 is, for example, a CPU. The processor 31 implements various processes by executing programs.

The memory 32 is a storage device which stores programs and data. The memory 32 includes, for example, a ROM that is a read-only nonvolatile memory, a RAM that temporarily stores data, and a rewritable nonvolatile memory.

The processor 31 functions as a processing unit which executes various processes by executing, with use of the RAM, the programs stored in the ROM or nonvolatile memory of the memory 32.

The upper-level communication interface 33 is an interface for communicating with the upper-level apparatus (information management apparatus) 2. The processor 31 accesses the second database 16 provided in the upper-level apparatus 2 via the upper-level communication interface 33. The upper-level communication interface 33 is also an interface for accessing the database. In addition, the upper-level communication interface 33 may be configured to have a function of communicably connecting to a primary inspection apparatus 50 of the primary inspection system 4 and a secondary inspection apparatus 50 of the secondary inspection system 5.

The communication interface 34 is an interface for communicating with the respective devices in the 0th-order process system 3. The communication interface 34 includes a terminal and a circuit, which support a communication standard or the like for communicating with the respective devices in the 0th-order process system 3. For example, the communication interface 34 includes an interface for the processor 31 to communicate with the tag reader 23, camera 24, X-ray photography apparatus 25, form reader 26 and operation terminal 27.

Next, a configuration of the operation terminal 27 will be described.

As illustrated in FIG. 4, the operation terminal 27 includes a processor 41, a memory 42, a communication interface 43 and a touch panel 28.

The processor 41 executes an arithmetic process. The processor 41 is, for example, a CPU. The processor 41 implements various processes by executing programs.

The memory 42 is a storage device which stores programs and data. The memory 42 includes, for example, a ROM that is a read-only nonvolatile memory, a RAM that temporarily stores data, and a rewritable nonvolatile memory.

The processor 41 functions as a processing unit which executes various processes by executing, with use of the RAM, the programs stored in the ROM or nonvolatile memory of the memory 42.

The communication interface 43 is an interface for communicating with the information acquisition apparatus (0th-order process apparatus) 20. The communication interface 43 may be configured to communicate with other devices in the 0th-order process system 3.

The touch panel 28 is an example of a user interface which executes display of a screen, and generation of an operation signal corresponding to the operator's operation. The touch panel 28 includes a display 45 and a touch sensor 46 which are constructed as one body. However, the operation terminal 27 may be configured to include, as a user interface, an operation device that generates an operation signal corresponding to an operation, in addition to the touch panel 28. The operation device may be any of such devices as a mouse, a trackball, a keyboard, a trackpad, and the like.

The display 45 displays, on the screen, data (screen data) for display, which is supplied from the processor 41 or a graphic controller (not shown). The touch sensor 46 generates an operation signal indicative of a position which is touched by the operator, who operates the operation terminal 27, on the screen displayed on the display 45. Thereby, the touch panel 28 functions as a user interface which detects, by the touch sensor 46, an input to an icon that functions as an operation key displayed on the display 45.

Next, a description will be given of a configuration of the primary inspection system 4 and secondary inspection system 5 according to the embodiment.

FIG. 5 is a view illustrating a configuration example of the primary inspection system 4 and secondary inspection system 5 according to the embodiment.

Note that, in the present embodiment, the description is given on the assumption that the primary inspection system 4 and the secondary inspection system 5 include a similar configuration as illustrated in FIG. 5. However, actually, the primary inspection system 4 and the secondary inspection system 5 are different systems, and the primary inspection system 4 is installed on a primary inspection site, and the secondary inspection system 5 is installed on a secondary inspection site that is different from the primary inspection site. Thus, the primary inspection system 4 and the secondary inspection system 5 may include different configurations. For example, in the secondary inspection system 5, as will be described later, a space for performing work for unpacking and inspection may be secured for the operator to unpack and inspect the parcel M.

The primary inspection system 4 (secondary inspection system 5) includes an inspection apparatus (primary inspection apparatus, secondary inspection apparatus) 50, a first conveyor 51, a second conveyor 52, a distribution mechanism 53, a form reader 54, and an operation terminal 55. The inspection apparatus 50 is configured to be communicable with the first conveyor 51, second conveyor 52, distribution mechanism 53, form reader 54 and operation terminal 55.

The first conveyor 51 conveys the parcel M that is the inspection target in a first direction. The parcel M, which is the inspection target of the inspection system 1, is the parcel, the information of which was read by the 0th-order process system 3 as illustrated in FIG. 3. The first conveyor 51 repeatedly conveys and stops the parcel M in accordance with the control of the inspection apparatus 50. The operation of the first conveyor 51 is controlled to enable the operator to easily perform the work of inspection or the like of the parcel M placed on the first conveyor 51. For example, such an operational implementation is performed that in the state in which the conveyance of the parcel M by the first conveyor 51 is stopped, the work of inspection or the like by the operator is conducted for the parcel M placed on the first conveyor 51. In addition, the parcel M, of which the inspection result was determined to be OK (for example, a deliverable normal parcel), is sent to a rear end portion of the first conveyor 51. A mechanism, which guides the parcel M that was determined to be normal to a sorting apparatus (sorter) that sorts the parcel M according to the address, may be provided on the rear end portion of the first conveyor 51.

In addition, a gate 53a, which is driven by the distribution mechanism 53, is provided on the conveyance path of the parcel M by the first conveyor 51. The distribution mechanism 53 rotates the gate 53a and performs distribution (sorting) as to whether the parcel M that was conveyed by the first conveyor 51 is to be conveyed by the first conveyor 51 as such, or is to be conveyed by the second conveyor 52. When the parcel M is distributed to the second conveyor 52, the gate 53a is set in such a position as to guide the parcel M, which is conveyed by the first conveyor 51, to the second conveyor 52. In addition, when the parcel M is to be conveyed by the first conveyor 51 as such, the gate 53a is set in such a position as not to interfere with the parcel M conveyed by the first conveyor 51.

The second conveyor 52 conveys the parcel M in a second direction, the parcel M being distributed from the first conveyor 51 by the gate 53a. The parcel M, of which the inspection result was determined to be NG (the secondary inspection is necessary, or the parcel M is to be rejected), is sent to a rear end portion of the second conveyor 52. A mechanism for sending the parcel M to the secondary inspection system 5 or a reject accumulation unit may be provided on the rear end portion of the second conveyor 52. For example, a mechanism for sending the parcel M to the secondary inspection system 5 may be provided on the rear end portion of the second conveyor 52 of the primary inspection system 4. In addition, a mechanism for sending the parcel M to the reject accumulation unit, which accumulates rejected parcels, may be provided on the rear end portion of the second conveyor 52 of the secondary inspection system 5.

The distribution mechanism 53 drives the gate 53a and distributes the parcel M that is conveyed by the first conveyor 51. The gate 53a is disposed on the first conveyor 51 on the downstream side of the position where the inspection work for the parcel M is conducted. For example, when the inspection result of the parcel M conveyed by the first conveyor 51 is OK, the distribution mechanism 53 drives the gate 53a such that the parcel M is conveyed by the first conveyor 51 as such. In addition, when the inspection result of the parcel M conveyed by the first conveyor 51 is NG (the secondary inspection is necessary, or the parcel M is to be rejected), the distribution mechanism 53 drives the gate 53a such that the parcel M is guided to the second conveyor 52.

Furthermore, the distribution mechanism 53 may be configured as a retention mechanism that retains the parcel M, which is conveyed by the first conveyor 51, by the gate 53a. For example, the distribution mechanism 53 moves the gate 53a to such a position as to hold back the parcel M that is conveyed by the first conveyor 51, thereby staying the parcel M on the first conveyor 51. Thereby, when a plurality of parcels (parcels of a multiple-item group), which form one set, are processed, the distribution mechanism 53 can retain a parcel, which was inspected earlier, on the first conveyor 51 by the gate 53a. Specifically, by retaining each parcel of the multiple-item group by the distribution mechanism 53, the inspection apparatus 50 can execute control to distribute the parcels of the multiple-item group together in the same direction, based on a comprehensive determination result (a result of multiple-item determination) for the parcels of the multiple-item group.

Note that the mechanism that retains the parcel conveyed by the first conveyor 51 is not limited to a mechanism realized by the driving of the gate 53a. The mechanism that retains the parcel may be any mechanism which retains each parcel such that the parcels of the multiple-item group can be conveyed together to the same destination of distribution.

The form reader 54 is configured to read identification information from the form M1 or tag M2 attached to the parcel M on the first conveyor 51. The form reader 54 may be a handy scanner which is held by the hand of the operator to perform scanning, or may be a form reader which is disposed in a fixed position and reads identification information from the form M1 or tag M2 attached to the parcel M conveyed by the first conveyor 51.

The operation terminal 55 generates a signal (operation signal) corresponding to an operation input of the operator, and supplies the operation signal to the inspection apparatus 50. The operation terminal 55 includes a touch panel 56 that includes a display and a touch sensor. The operation terminal 55 may be configured to key-input the identification information of the parcel M to be inspected, by the operator using the touch sensor of the touch panel 56.

The operation terminal 55 displays, on the display of the touch panel 56, the information relating to the parcel M of the identification information read by the form reader 54 or the identification information input by the key-input. The operation terminal 55 displays on the display the information (external appearance image, X-ray image, form information, and tag information) acquired from the parcel M in the 0th-order process system 3. In the primary inspection system 4, the operator performs an inspection for determining whether the parcel M is normal, based on the information displayed on the display of the touch panel 56. In the case of the inspection result that the parcel M is normal (OK), the operator gives an instruction that the parcel M is deliverable, by using the touch panel. In the case of the inspection result that the parcel M is not normal (NG), the operator gives an instruction that the parcel M requires the secondary inspection or the parcel M is to be rejected, by using the touch panel.

Next, a description will be given of a configuration of a control system in the primary inspection system 4 or secondary inspection system 5 according to the embodiment.

FIG. 6 is a block diagram illustrating a configuration example of the control system in the primary inspection system 4 or secondary inspection system 5 according to the embodiment.

As illustrated in FIG. 6, the primary inspection system 4 (secondary inspection system 5) is configured such that the respective devices (first conveyor 51, second conveyor 52, distribution mechanism 53, form reader 54, and operation terminal 55) are connected to the inspection apparatus (primary inspection apparatus, secondary inspection apparatus) 50.

The inspection apparatus 50 is composed of an apparatus, such as a personal computer (PC), which can execute communication of data, processing of data, and storage of data. The inspection apparatus 50 causes the operation terminal 55 to display the information (external appearance image, X-ray image, form information and tag information) of the parcel M to be inspected, and acquires an inspection result which the operator inputs by the operation terminal 55. In accordance with the inspection work and the inspection result, the inspection apparatus 50 controls the driving of the first conveyor 51, second conveyor 52 and distribution mechanism 53. The inspection apparatus 50 acquires from the upper-level apparatus 2 the information of the parcel M corresponding to the identification information (parcel ID) read by the form reader 54, or the identification information which the operator key-inputs by operation terminal 55, and supplies the information of the parcel M, which is acquired from the upper-level apparatus 2, to the operation terminal 55.

As illustrated in FIG. 6, the inspection apparatus 50 includes a processor 61, a memory 62, an upper-level communication interface 63 and a communication interface 64.

The processor 61 executes an arithmetic process. The processor 61 is, for example, a CPU. The processor 61 implements various processes by executing programs.

The memory 62 is a storage device which stores programs and data. The memory 62 includes, for example, a ROM that is a read-only nonvolatile memory, a RAM that temporarily stores data, and a rewritable nonvolatile memory.

The processor 61 functions as a processing unit which executes various processes by executing, with use of the RAM, the programs stored in the ROM or nonvolatile memory of the memory 62.

The upper-level communication interface 63 is an interface for communicating with the upper-level apparatus (information management apparatus) 2. The processor 61 accesses the second database 16 provided in the upper-level apparatus 2 via the upper-level communication interface 63. The upper-level communication interface 63 is also an interface for the inspection apparatus 50 to access the database. The upper-level communication interface 63 may be configured to have a function of communicating with the information acquisition apparatus 20 of the 0th-order process system 3, and the like.

The communication interface 64 is an interface for communicating with the respective devices in the primary inspection system 4 (secondary inspection apparatus 5). The communication interface 64 includes a terminal and a circuit, which support a communication standard or the like for communicating with the respective devices.

Next, a configuration of the operation terminal 55 will be described.

As illustrated in FIG. 6, the operation terminal 55 includes a processor 71, a memory 72, a communication interface 73 and a touch panel 56.

The processor 71 executes an arithmetic process. The processor 71 is, for example, a CPU. The processor 71 implements various processes by executing programs.

The memory 72 is a storage device which stores programs and data. The memory 72 includes, for example, a ROM that is a read-only nonvolatile memory, a RAM that temporarily stores data, and a rewritable nonvolatile memory.

The processor 71 functions as a processing unit which executes various processes by executing, with use of the RAM, the programs stored in the ROM or nonvolatile memory of the memory 72.

The communication interface 73 is an interface for communicating with the inspection apparatus 50. The communication interface 73 may be configured to communicate with other devices in the primary inspection system 4 (secondary inspection system 5).

The touch panel 56 is an example of a user interface which executes display of a screen, and generation of an operation signal corresponding to the operator's operation. The touch panel 56 includes a display 75 and a touch sensor 76 which are constructed as one body. However, the operation terminal 55 may be configured to include, as a user interface, a display which displays a screen, and an operation device that generates an operation signal corresponding to an operation. The operation device may be a mouse, a trackball, a keyboard, a trackpad, or the like.

The display 75 displays, on the screen, data (screen data) for display, which is supplied from the processor 71 or a graphic controller (not shown). The touch sensor 76 generates an operation signal indicative of a position which is touched by the operator, who operates the operation terminal 55, on the screen displayed on the display 75. Thereby, the touch panel 56 functions as a user interface which detects, by the touch sensor 76, an input to an icon that functions as an operation key displayed on the display 75.

Next, an operation of the inspection system 1 according to the embodiment will be described.

Figure 7:
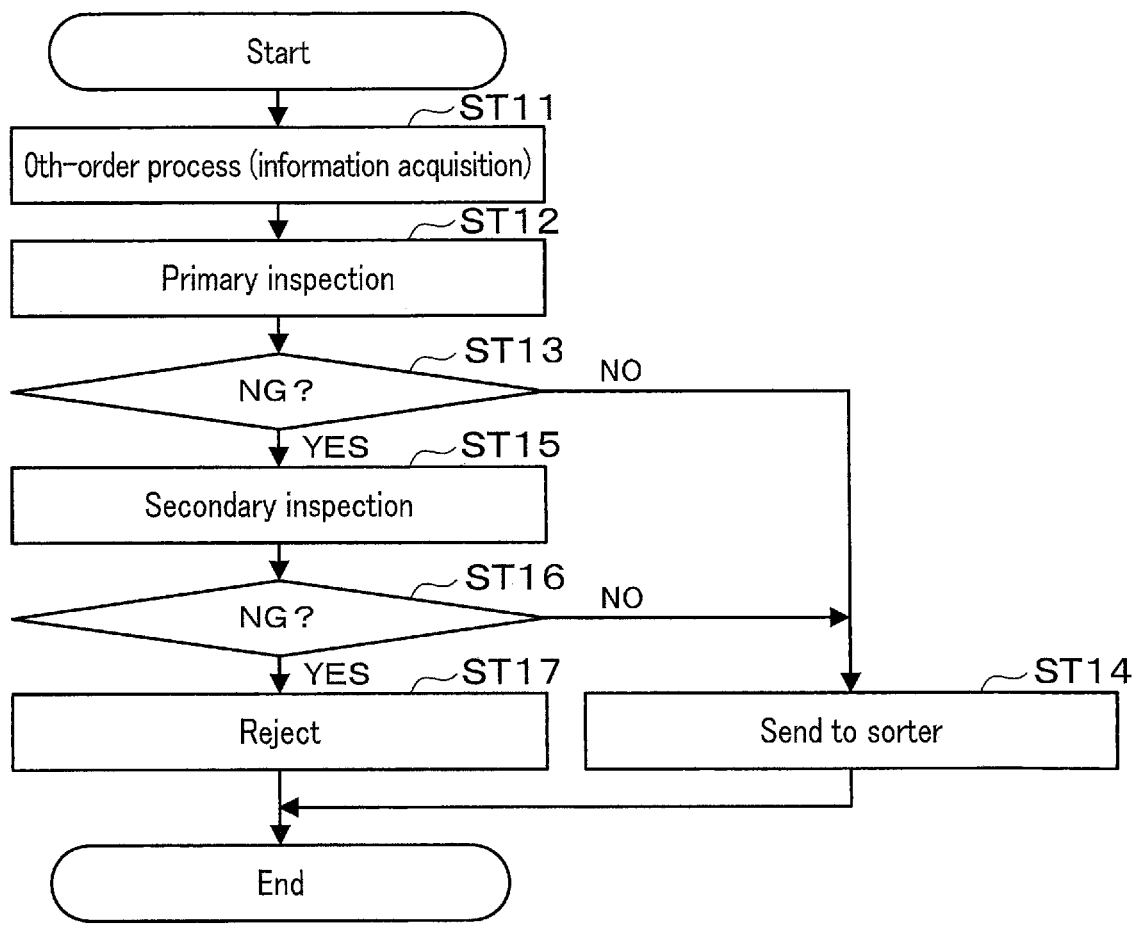
FIG. 7 is a flowchart for schematically describing a flow of an operation of the entirety of the inspection system according to the embodiment.

FIG. 7 is a flowchart for schematically describing the operation of the entirety of the inspection system 1 according to the embodiment.

The inspection system 1 successively executes a 0th-order process (information acquisition process) by the 0th-order process system, a primary inspection process by the primary inspection system, and a secondary inspection process by the secondary inspection system.

In the state in which the upper-level apparatus 2 of the inspection system 1 stores advance data relating to a parcel, which is an inspection target, in the first database 15, the 0th-order process system 3 registers in the second database 16 various kinds information from the parcel M. Specifically, the upper-level apparatus 2 accepts various kinds of information which the 0th-order process system acquires from the parcel M that is the inspection target.

The 0th-order process system 3 executes the information acquisition process (0th-order process) of acquiring the external appearance image, X-ray image, form information and tag information from the parcel M of the inspection target (ST11). The 0th-order process system 3 acquires a parcel ID (identification information such as a mail article number) of the parcel of the inspection target placed on the conveyor 22, and correlates, and registers in the upper-level apparatus 2, the parcel ID, and the information such as the external appearance image, X-ray image, form information and tag information.

In addition, in the present embodiment, it is assumed that a parcel group, in which a plurality of parcels form one set, is parcels of a multiple-item group. The parcels of the multiple-item group are a parcel group which is, in principle, delivered together, and is a plurality of parcels with the same sender and the same destination. As regards the parcels of the multiple-item group, when the 0th-order process is executed, a multiple-item-group ID is allocated in addition to identification information (parcel IDs) for identifying the respective parcels. The multiple-item-group ID is identification information for each multiple-item group (one set), and is given to all parcels of the multiple-item group. Moreover, it is assumed that the multiple-item-group includes information indicative of the number of parcels which form the multiple-item group (one set).

The upper-level apparatus 2 registers in the second database 16 the information relating to the parcel M acquired by the 0th-order process from the 0th-order process system 3. Here, when the 0th-order process system 3 executed the information acquisition process for the parcels of the multiple-item group, the upper-level apparatus 2 registers in the second database 16 the multiple-item-group ID and the information corresponding to the respective parcels, by correlating the multiple-item-group ID and the information corresponding to the respective parcels with the parcel IDs.

The parcel, for which the 0th-order process was executed, is sent to the primary inspection system 4 installed on the primary inspection site. The primary inspection system 4 provides the information for the operator to perform an inspection (primary inspection) for the parcel that is the inspection target, and performs the primary inspection for acquiring the inspection result (primary inspection result) by the operator (ST12). In the primary inspection process, the operator visually recognizes the external appearance image, X-ray image, form information and the like of the parcel, and determines whether the secondary inspection is necessary. For example, when the parcel is suspected to include a controlled item, the operator determines that the parcel requires the secondary inspection.

When it is determined that the secondary inspection is not necessary (normal, OK) (ST13, NO), the primary inspection system 4 finishes the inspection for the parcel, and determines that the destination of distribution of the parcel is the address sorting apparatus (sorter) (ST14). In addition, when it is determined that the secondary inspection is necessary (NG) (ST13, YES), the primary inspection system 4 determines that the destination of distribution of the parcel is the secondary inspection system installed on the secondary inspection site.

Here, as regards the parcels of the multiple-item group (a plurality of parcels to which the identical multiple-item-group ID is allocated), the primary inspection system 4 executes such control that all parcels of the multiple-item group have the same destination of distribution. Specifically, when it is determined that all parcels of the multiple-item group are normal (the secondary inspection is not necessary), the primary inspection system 4 distributes all parcels of the multiple-item group to the sorter. When it is determined that even one of the parcels of the multiple-item group is abnormal (the secondary inspection is necessary), the primary inspection system 4 distributes all parcels of the multiple-item group to the secondary inspection system 5 installed on the secondary inspection site.

The parcel, which was determined to require the secondary inspection by the primary inspection, is sent to the secondary inspection system 5 installed on the secondary inspection site. The secondary inspection system 5 executes the secondary inspection process in which the operator unpacks the parcel that is the inspection target, and performs a detailed inspection (secondary inspection) (ST15). In the secondary inspection process, the operator unpacks the parcel and inspects the content of the parcel. For example, when it is confirmed that a controlled item is included in the parcel, the operator determines that the parcel is abnormal (NG). The operator inputs a result of the inspection (secondary inspection) through the touch panel 56. Here, when the operator determined that the parcel is abnormal, the operator may input through the touch panel 56 the reason for the determination that the parcel is abnormal (a controlled item, a dangerous article, abnormality in regard to the sender, abnormality in regard to the receiver, a taxable item, or the like).

The secondary inspection system determines whether the parcel of the inspection target is abnormal or normal, in accordance with the input to the touch panel 56 by the operator (ST16). When the input indicating that the parcel is abnormal (NG) is made to the touch panel 56 (ST16, YES), the secondary inspection system 5 determines that the destination of distribution of the parcel is the reject (ST17). On the other hand, when the input indicating that the parcel is normal is made to the touch panel 56 (ST16, NO), the secondary inspection system 5 determines that the destination of distribution of the parcel is the address sorting apparatus (sorter) which sorts the parcel according to the destination address (ST14).

However, also in the secondary inspection process, such processing is executed that the identical destination of distribution is set for all parcels of the multiple-item group. Specifically, when it is determined that all parcels of the multiple-item group are determined to be OK, the secondary inspection system 5 sends all parcels of the multiple-item group to the sorter, and when even one of the parcels of the multiple-item group is determined to be NG, the secondary inspection system 5 sends all parcels of the multiple-item group to the accumulation unit which accumulates parcels that are determined to be rejected.

Next, a detailed description will be given of the above-described information acquisition process (0th-order process) for the parcels of the multiple-item group by the 0th-order process system 3.

Figure 8:
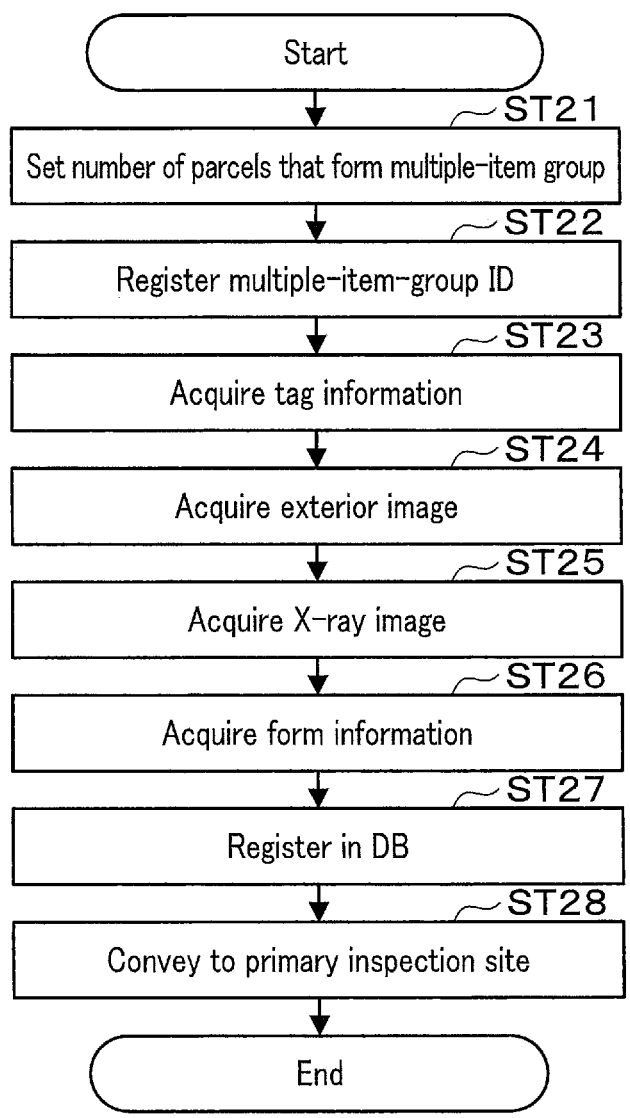
FIG. 8 is a flowchart for describing an operation example of an information acquisition (0th-order process) system in the inspection system according to the embodiment.

FIG. 8 is a flowchart for describing an example of the information acquisition process for the parcels of the multiple-item group by the 0th-order process system 3.

In the 0th-order process system 3, when parcels of a multiple-item group are inspected, the number of parcels that become the multiple-item group (one set) is first set. For example, the operator inputs the number (number-of-items information) of parcels of the multiple-item group for which the 0th-order process is executed, by using the touch panel 28 of the operation terminal 27 in the 0th-order system 3. Here, the number of parcels may be input by a toggle switch or the like, which is connected to the operation terminal 27. In the present embodiment, it is assumed that the parcels of the multiple-item group are recognized by the number of parcels, which is input by the operator. For example, after the operator inputs the number of parcels that form the multiple-item group, the set number of parcels that are actually processed may be recognized as one set (multiple-item group). Alternatively, the operator may designate not only the number of parcels that form the multiple-item group, but also the parcel IDs, and the parcels that form the multiple-item group may be recognized by the parcel IDs.

The information acquisition apparatus 20 receives the information indicative of the number of parcels of the multiple-item group, which was input from the operation terminal 27 through the touch panel 28. The processor 31 of the information acquisition apparatus 20 sets the parcels, the number of which was input by the operation terminal 27, as the parcels to be processed as the multiple-item group (ST21). If the processor 31 sets the number of parcels of the multiple-item group, the processor 31 acquires a multiple-item-group ID which is allocated to the parcels of the multiple-item group, and registers the acquired multiple-item-group ID in the second database 16 of the upper-level apparatus 2 (ST22). For example, the processor 31 issues, as the multiple-item-group ID, the identification information for each multiple-item group, which includes the information indicative of the number of parcels of the multiple-item group.

After setting the parcels of the multiple-item group, the processor 31 causes the conveyor 22 to successively convey the respective parcels, and successively acquires the information from the tag reader 23, camera 24, X-ray photography apparatus 25 and form reader 26. Specifically, the tag reader 23 of the 0th-order system 3 reads tag information from the tag M2 attached to the parcel M that is being conveyed by the conveyor 22. The tag reader 23 supplies the read tag information, or information indicating that the tag could not be read, to the information acquisition apparatus 20. Thereby, the information acquisition apparatus 20 acquires the tag information of the parcel M, which is supplied from the tag reader 23 via the communication interface 34 (ST23).

The camera 24 of the 0th-order process system 3 photographs the parcel M which is being conveyed by the conveyor 22. The camera 24 supplies the image, which is captured by photographing the parcel M on the conveyor 22, to the information acquisition apparatus 20 as the external appearance image. Thereby, the information acquisition apparatus 20 acquires the external appearance image of the parcel M, which is supplied from the camera 24 via the communication interface 34 (ST24).

The X-ray photography apparatus 25 of the 0th-order process system 3 captures an X-ray image of the parcel M which is being conveyed by the conveyor 22. The X-ray photography apparatus 25 supplies the image, which is captured by radiating X-rays to the parcel M on the conveyor 22, to the information acquisition apparatus 20 as the X-ray image. Thereby, the information acquisition apparatus 20 acquires the X-ray image, which is supplied from the X-ray photography apparatus 25 via the communication interface 34 (ST25).

The form reader 26 of the 0th-order process system 3 reads the form information from the form M1 attached to the parcel M which is being conveyed by the conveyor 22. The form reader 26 supplies the read form information to the information acquisition apparatus 20. Thereby, the information acquisition apparatus 20 acquires the form information described on the form attached to the parcel, which is supplied from the form reader 26 via the communication interface 34 (ST26). Here, when the advance data (sender information, receiver information, and article information) relating to the parcel ID acquired from the tag or the like is registered, the processor 31 may use the advance data, which is registered in the first database 15, as dictionary data of OCR processing for the image that the form reader 26 reads.

The processor 31 of the information acquisition apparatus 20 correlates the various information, which is acquired from each parcel M, with the parcel ID, and supplies the correlated information and parcel ID to the upper-level apparatus 2 (ST27). Upon receiving the various information of the parcel M from the 0th-order process system 3, the upper-level apparatus 2 correlates, and registers in the second database 16, the parcel ID, and the multiple-item-group ID for each parcel of the multiple-item group, and the various information acquired from the parcel M.

FIG. 9 is a view illustrating an example of the second database 16 in which the information of the parcels of the multiple-item group, which is obtained by the 0th-order process, is registered.

FIG. 9 illustrates an example in which information of three parcels, which form one set, is registered. The multiple-item-group ID is commonly allocated to the three parcels, and includes information indicating that the parcels are a three-item group. The parcel ID is identification information allocated to each parcel that is an individual unit of processing, and the parcel ID is unique data which can identify each of parcels even when the parcels are a multiple-item group. The parcel ID is included in the information that is read by the tag reader 23. In addition, the parcel ID may be information which the operator inputs through the operation terminal 27.

The form information is information obtained as an OCR recognition result by the form reader 26 in regard to the form M1 attached to the parcel. The form information is, for example, information including sender information, receiver (destination) information, and article information indicative of the article content.

The X-ray image is an image which the X-ray photography apparatus 25 captures by using X-rays. The X-ray image may be not only an image in one direction, but also a plurality of X-ray images captured along a plurality of axes. The external appearance image is an image captured by the camera 24. As the external appearance image, a plurality of image data of different data formats may be registered. In addition, the X-ray image and external appearance image may be registered in the second database 16, not only with the addition of file names but also with the addition of storage paths.

In addition, the processor 31 of the information acquisition apparatus 20 registers the various kinds of information of the parcels of the multiple-item group in the second database 16, conveys the parcels of the multiple-item group by the conveyor 22, and sends the parcels of the multiple-item group to the primary inspection site where the primary inspection system 4 is installed (ST28). The parcels processed by the 0th-order process system 3 may be sent to the primary inspection system 4 from the conveyor 22, or may be conveyed to the primary inspection system 4 by other convey means (for example, AGV) from the rear end on the downstream side of the conveyor 22.

Note that in the 0th-order process system 3, it is assumed that information is successively acquired from the respective parcels M conveyed by the conveyor 22, and all parcels are sent to the primary inspection system 4. Thus, the parcels, for which the process in the 0th-order process system was completed, may successively be subjected to the process in the primary inspection system. Specifically, since the 0th-order process system 3 is not configured to distribute the respective parcels, even in the case of the parcels of the multiple-item group, the process in the primary inspection system 4 may be started for parcels for which the 0th-order process was finished earlier, without waiting for the end of the 0th-order process for all parcels of the multiple-item group.

Next, a detailed description will be given of the primary inspection process for the parcels of the multiple-item group by the primary process system 4.

Figure 10:
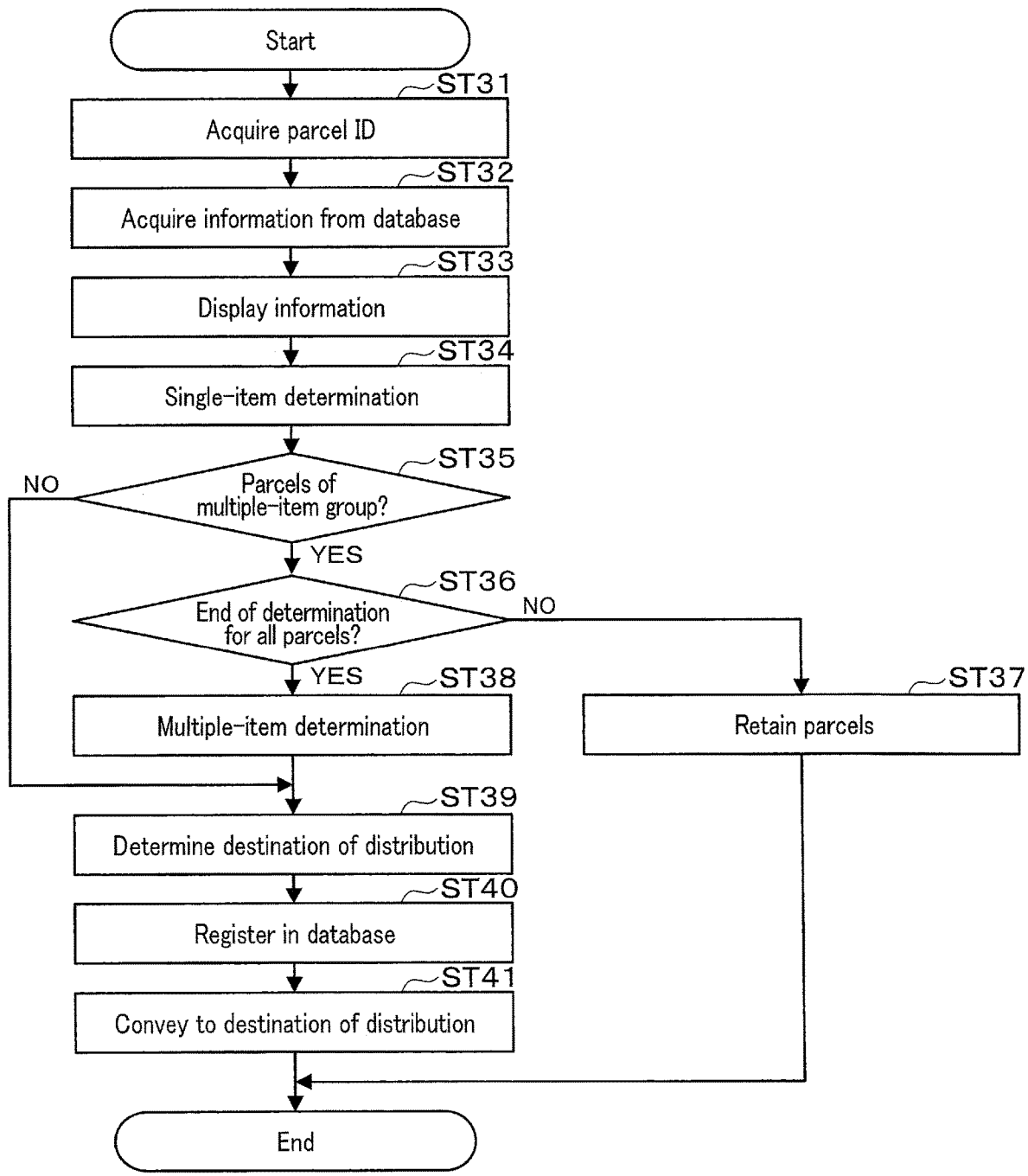
FIG. 10 is a flowchart for describing an example of a primary inspection process by the primary inspection system in the inspection system according to the embodiment.

FIG. 10 is a flowchart for describing an example of the primary inspection process for the parcels of the multiple-item group by the primary process system 4.

In the primary inspection system 4, an inspection (primary inspection) is performed for the parcels M, the information of which was registered in the second database 16 by the 0th-order process system. In the primary inspection, the operator views the information acquired from the parcels M by the 0th-order process, thereby determining whether the secondary inspection is necessary. As regards the parcels of the multiple-item group, since the parcels of the multiple-item group are distributed together, multiple-item determination is performed in addition to determination for each individual parcel.

To start with, in the primary inspection system 4, the parcel M that is the target of the primary inspection is placed on the first conveyor 51, and the parcel ID of the parcel M is input. The form reader 54 inputs the parcel ID of the parcel M by reading the tag M2 or form M1 attached to the parcel M. In addition, the parcel ID may be input by the operator using the touch panel 56 of the operation terminal 55, or the like.

The inspection apparatus 50 acquires the parcel ID, which was input by the form reader 54 or operation terminal 55, via the communication interface 64 (ST31). Upon acquiring the parcel ID, the processor 61 of the inspection apparatus 50 accesses the upper-level apparatus 2 by the upper-level communication interface 63, and acquires various information corresponding to the parcel ID from the second database 16 (ST32). Upon receiving the information relating to the parcel corresponding to the parcel ID, the processor 61 causes the touch panel 56 of the operation terminal 55 to display the information (the information that is presented to the operator for the primary inspection) acquired from the second database 16 (ST33). The processor 61 causes the display 75 of the touch panel 56 to display the X-ray image, external appearance image, form information, and the like, as the information (reference information) that is presented to the operator.

Figure 11:
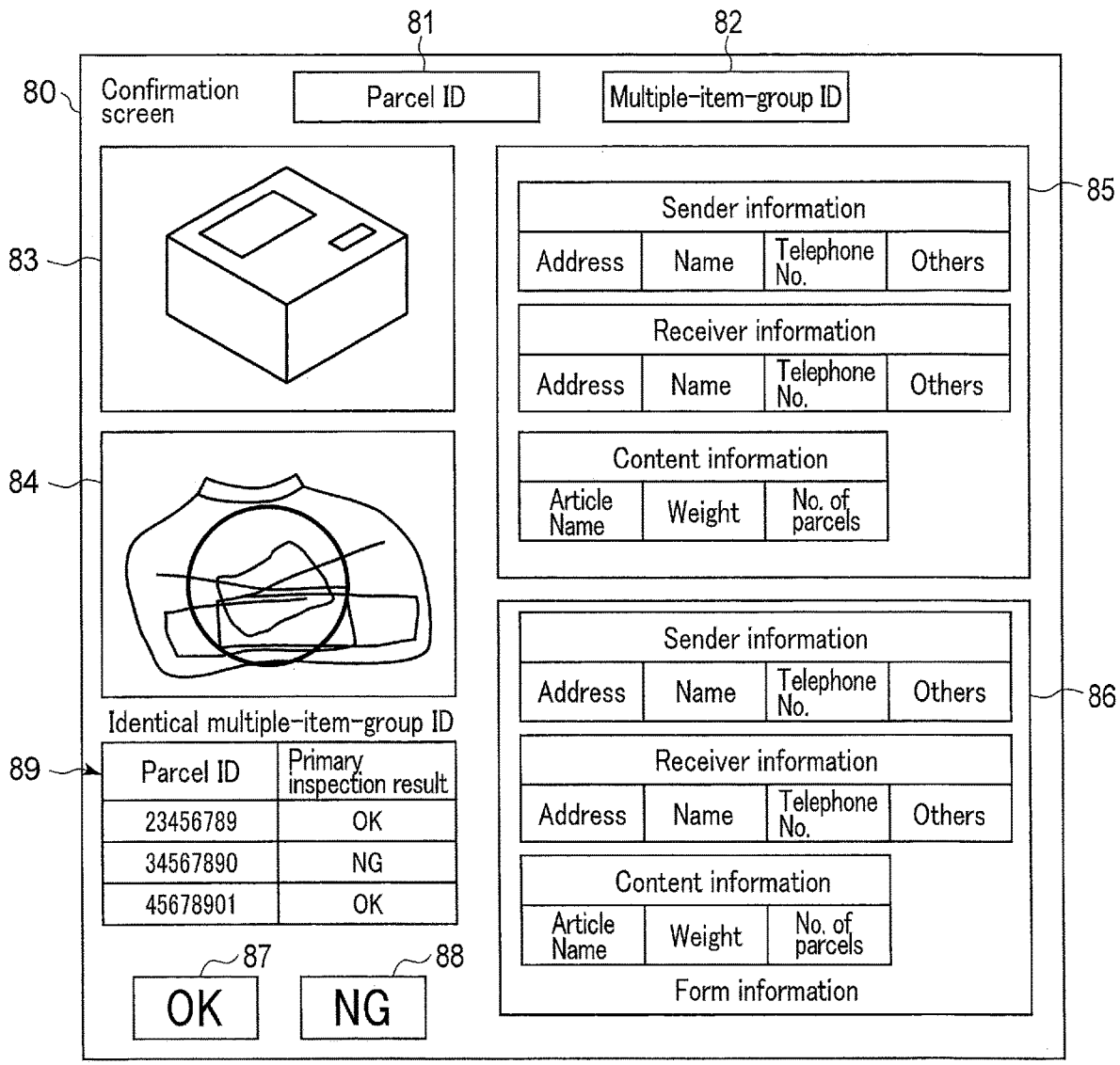
FIG. 11 is a view illustrating an example of a confirmation screen which is displayed for a primary inspection of parcels in the inspection system according to the embodiment.

FIG. 11 is a view illustrating an example of a screen (confirmation screen) 80 which is displayed on the touch panel 56 of the operation terminal 27 as the information to be presented to the operator.

The confirmation screen 80 displays the information which is used when the operator judges whether the secondary inspection (unpacking and confirmation) is necessary for the parcel M. The information displayed on the confirmation screen 80 is reference information that is used as a reference for the operator's judgment. The confirmation screen 80 includes a parcel ID 81, a multiple-item-group ID 82, an external appearance image 83, an X-ray image 84, advance data (or tag information) 85, form information 86, an OK button 87, an NG button 88, and other parcel information 89.

The parcel ID 81 is individual identification information allocated to each parcel. The multiple-item-group ID 82 is identification information allocated to the parcels of the multiple-item group. The multiple-item-group ID 82 indicates the fact that the parcel is a parcel of a multiple-item group (one set of multiple items), and indicates the number of parcels of the multiple-item group. For example, as illustrated in FIG. 9, the parcel IDs and the multiple-item group ID registered in the second database 16 are displayed on the touch panel 56. In addition, in the case of the parcels of the multiple-item group, not only the multiple-item-group ID but also the number of parcels of the multiple-item group may be displayed on the confirmation screen.

The external appearance image 83 is an external appearance image of the parcel M, which was acquired by the camera 24. The X-ray image 84 is an X-ray image of the parcel M, which was acquired by the X-ray photograph apparatus 25. The X-ray image 84 or the external appearance image 83 may be displayed on a display which is provided separately from the touch panel 56.

The advance data 85 is information which is registered in the first database 15 in association with the parcel ID acquired by the tag reader 23 recognizing the tag M2 attached to the parcel M, or the parcel ID that the operator inputs. Note that when the tag reader 23 fails to read the tag code M2, the parcel ID 81, multiple-item-group ID 82 and advance data 85 may be left as blank fields, and the operator may be prompted to input the parcel ID (identification information such as a mail article number).

The form information 86 is form information that was read from the form M1 of the parcel M by the form reader 26. In the example of FIG. 11, the advance data 85 and the form information 86 display the information such as the sender information of the parcel, the receiver information of the parcel, and the content information of the article.

The OK button 87 and the NG button 88 are buttons which can be selected by the touch sensor 76. The operator confirms the reference information displayed on the confirmation screen 80, and judges whether the secondary inspection (unpacking and confirmation) is necessary for the parcel M. Specifically, the operator confirms the external appearance image 83, X-ray image 84, advance data 85 and form information 86 displayed on the confirmation screen 80, judges whether the secondary inspection is necessary for the parcel M, and selects and inputs one of the OK button 87 or the NG button 88. In other words, the operator inputs the OK button 87 when the operator judges that the secondary inspection is not necessary. In addition, the operator inputs the NG button 88 when the operator judges that the secondary inspection is necessary for the parcel.

The other parcel information 89 is indicative of the information relating to other parcels having the same multiple-item-group ID as the present parcel. In the example illustrated in FIG. 11, as the other parcel information 89, the parcel IDs of the other parcels of the multiple-item group and primary inspection results are displayed. In addition, when a display position of the parcel ID or inspection result displayed in the other parcel information 89 is touched, the external appearance image of the corresponding parcel may be displayed. By displaying the other parcel information 89, the inspection state, or the like, relating to the other parcels can be confirmed when inspecting the parcels of the multiple-item group.

After displaying the confirmation screen as the reference information that is presented to the operator, the processor 61 accepts the input of the inspection result by the operator. The processor 61 executes determination (single-item determination) for the single-item parcel in accordance with input of the inspection result by the operator (ST34). For example, if the OK button 87 is input by the operator, the processor 61 determines that the parcel is a normal parcel that does not require the secondary inspection. On the other hand, if the NG button 88 is input by the operator, the processor 61 determines that the parcel is a parcel that requires the secondary inspection. Here, it is assumed that the processor 61 temporarily stores the result of the single-item determination in the memory 62. However, the processor 61 may immediately register the result of the single-item determination in the second database 16 of the upper-level apparatus 2.

After executing the single-item determination for each individual parcel, the processor 61 determines whether the parcel is a parcel of a multiple-item group (ST35). For example, based on whether a multiple-item-group ID is allocated to the parcel for which the single-item determination was executed, the processor 61 determines whether the parcel is a parcel of the multiple-item group.

When the processor 61 determines that the parcel is not a parcel of the multiple-item group (ST35, NO), the processor 61 determines the destination of distribution of the parcel, based on the result of the single-item determination (ST39). For example, when it is determined that the parcel is the normal parcel that does not require the secondary inspection, the processor 61 determines that the destination of distribution of the parcel is the sorter which sorts the parcel according to the destination address. On the other hand, when it is determined that the parcel is the parcel that requires the secondary inspection, the processor 61 determines that the destination of distribution of the parcel is the secondary inspection system. Upon determining the destination of distribution, the processor 61 registers the result of the single-item determination and the information indicative of the destination of distribution in the second database 16 (ST40), and conveys the parcel to the determined destination of distribution (ST41).

When the processor 61 determines that the parcel is a parcel of the multiple-item group (ST35, YES), the processor 61 determines whether the single-item determination for all the parcels of the multiple-item group was finished (ST36). When the processor 61 determines that the single-item determination for the parcels of the multiple-item group is not finished (ST36, NO), the processor 61 retains the parcel in order to distribute all the parcels of the multiple-item group together (ST37). For example, in the configuration example illustrated in FIG. 5, the processor 61 operates the gate 53*a* by the distribution mechanism 53, and retains the parcel on the conveyor 51. When the parcel of the multiple-item group is retained, the processor 61 executes the inspection process for the next parcel in the state in which the present parcel is retained. Note that in the inspection system 1 according to the present embodiment, it is assumed that the control to retain the parcel of the multiple-item group is executed in each inspection (the primary instruction by the primary inspection system 4 and the secondary inspection by the secondary inspection system 5). However, the parcel may be retained at a position on the downstream of the secondary inspection (final inspection) by the secondary inspection system and on the upstream of the sorter, such that all the parcels of the multiple-item group are collected after the secondary inspection.

When the processor 61 determines that the single-item determination for all the parcels of the multiple-item group was finished (ST36, YES), the processor 61 executes multiple-item determination for the parcels of the multiple-item group (ST38). For example, when even one parcel was determined to require the secondary inspection (abnormal, NG) in the single-item determination for each parcel of the multiple-item group, the processor 61 determines, in the multiple-item determination, that the secondary inspection is necessary (abnormal, NG) for all the parcels of the multiple-item group. On the other hand, when it is determined in the single-item determination that all the parcels of the multiple-item group are determined to not require the secondary inspection (normal), the processor 61 determines, in the multiple-item determination, that the secondary inspection is not necessary (normal) for all the parcels of the multiple-item group.

The processor 61 determines the destination of distribution of the parcels of the multiple-item group, based on the result of the multiple-item determination (ST39). For example, when it is determined in the multiple-item determination that the secondary inspection is not necessary (normal), the processor 61 determines that the destination of distribution of the parcels of the multiple-item group is the sorter.

On the other hand, when it is determined in the multiple-item determination that the secondary inspection is necessary, the processor 61 determines that the destination of distribution of the parcels of the multiple-item group is the secondary inspection system 5. Upon determining the destination of distribution, the processor 61 registers the result of the single-item determination for each parcel of the multiple-item group, the result of the multiple-item determination, and the information indicative of the destination of distribution in the second database 16 (ST40). Upon registering the result of the multiple-item determination in the second database 16, the processor 61 conveys all the parcels of the multiple-item group, including the parcel that is being retained, to the destination of distribution corresponding to the result of the multiple-item determination (ST41).

FIG. 12 illustrates an example in which the information of the inspection results (single-item determination, multiple-item determination, and destination of distribution) is added to the second database 16 illustrated in FIG. 11.

In the example illustrated in FIG. 12, only one of three parcels of the multiple-item group is determined to be "dangerous article (secondary inspection is necessary)" in the single-item determination, and all of the three parcels of the multiple-item group are determined to be "dangerous article (secondary inspection is necessary)" in the multiple-item determination. In this case, as regards the three parcels of the multiple-item group, the destination of distribution, which corresponds to the result of the multiple-item determination, is determined. Thus, in the example illustrated in FIG. 12, the destination of distribution of each parcel of the multiple-item group is registered as "2 (secondary inspection site)".

As described above, as regards the parcels of the multiple-item group, the inspection apparatus of the primary inspection process system executes the multiple-item determination based on the results of the single-item determination for all parcels such that all parcels of the multiple-item group are distributed to the same destination, and distributes the parcels of the multiple-item group to the destination of distribution corresponding to the result of the multiple-item determination.

In addition, the inspection apparatus of the primary inspection process system retains the parcel for which the single-item determination is executed earlier among the parcels of the multiple-item group, until executing the multiple-item determination; and distributes all parcels of the multiple-item group to the same destination of distribution in accordance with the result of the multiple-item determination. Thereby, all parcels of the multiple-item group can be distributed to the same destination of distribution in accordance with the result of the multiple-item determination based on the single-item determination for each individual parcel of the multiple-item group.

Next, a detailed description will be given of the secondary inspection process for the parcels of the multiple-item group by the secondary process system 5.

Figure 13:
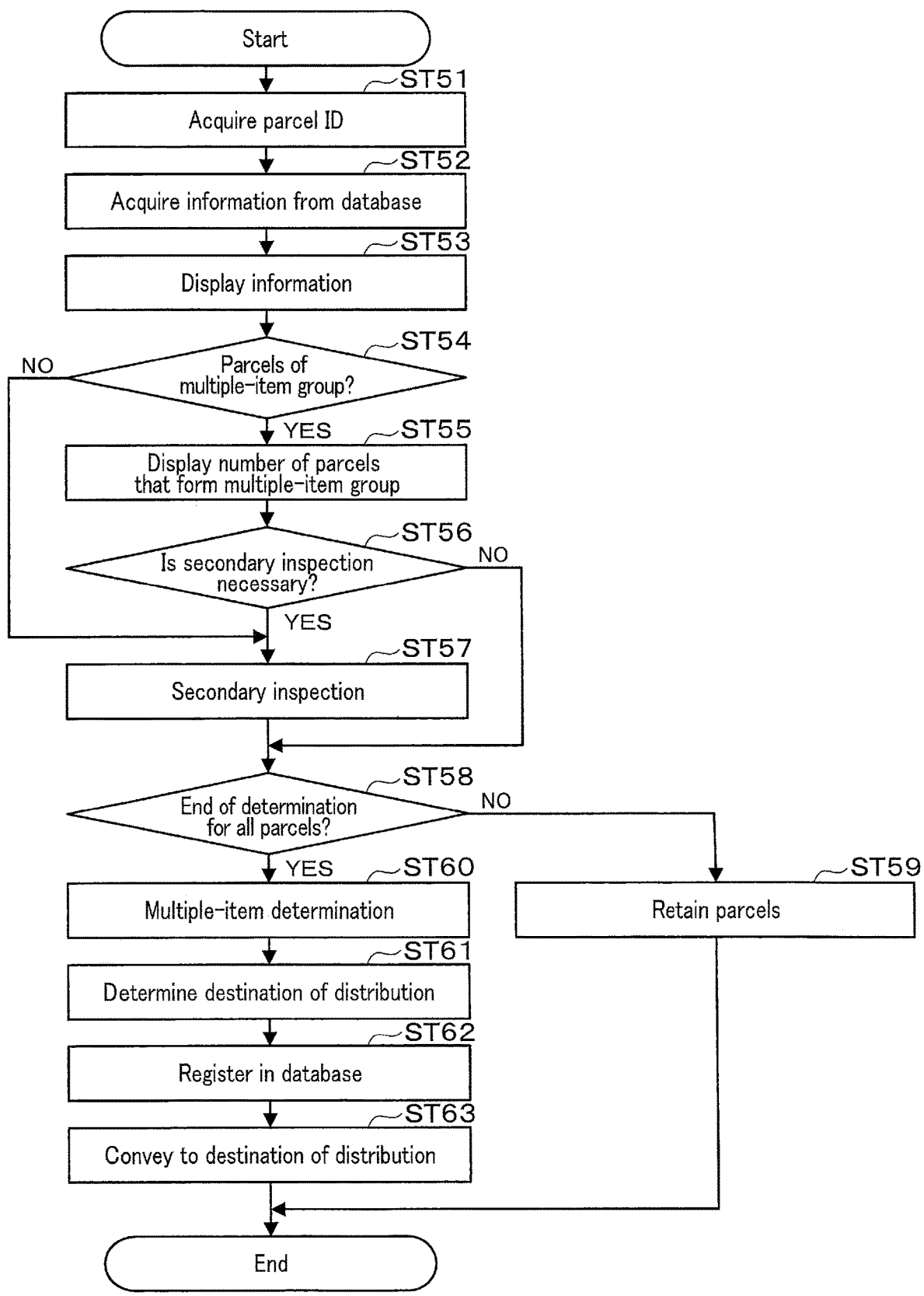
FIG. 13 is a flowchart for describing an operation example of the secondary inspection system in the inspection system according to the embodiment.

FIG. 13 is a flowchart for describing an example of the secondary inspection process for the parcels of the multiple-item group by the secondary inspection system 5.

In the secondary inspection system 5, an inspection (secondary inspection) is executed for the parcel for which the secondary inspection is determined to be necessary by the primary process system 4. In the secondary inspection system 5, as the secondary inspection, the operator inspects the content of the parcel in detail by unpacking the parcel. In addition, as regards the parcels of the multiple-item group among the parcels supplied as the inspection targets, the secondary inspection system 5 may execute the secondary inspection for the parcel for which the secondary inspection was determined to be necessary in the single-item determination in the primary inspection.

To start with, in the secondary inspection system 5, the parcel M that is the target of the secondary inspection is placed on the first conveyor 51, and the parcel ID of the parcel M is input. For example, the parcel ID of the parcel M is input by reading the tag M2 or form M1 by the form reader 54. In addition, the parcel ID may be input by the operator using the touch panel 56 or the like in the operation terminal 55.

The processor 61 of the inspection apparatus 50 of the secondary inspection system 5 acquires the parcel ID, which was input by the form reader 54 or operation terminal 55, via the communication interface 64 (ST51). Upon acquiring the parcel ID, the processor 61 accesses the upper-level apparatus 2 by the upper-level communication interface 63, and acquires various information corresponding to the parcel ID from the second database 16 (ST52). In the secondary inspection, the processor 61 also acquires the inspection results (the results of the single-item determination and multiple-item determination) in the primary inspection from the second database 16.

Upon acquiring the information corresponding to the parcel ID, the processor 61 causes the touch panel 56 of the operation terminal 55 to display the information (the information to be presented to the operator for the purpose of the secondary inspection) acquired from the second database 16 (ST53). The processor 61 displays the inspection results in the primary inspection as the information that is presented to the operator. In addition, the processor 61 may cause the display 75 of the touch panel 56 to display the X-ray image, external appearance image, form information, and the like, together with the inspection results in the primary inspection. For example, the processor 61 causes the display 75 of the touch panel 56 to display the confirmation screen 80 as illustrated in FIG. 11. In this case, if the parcel of the input parcel ID is a parcel of a multiple-item group, the confirmation screen 80 displays, as the other parcel information 89, the parcel IDs of the other parcels of the multiple-item group, and the primary inspection results. As described above, on the confirmation screen 80, if the display position of the parcel ID or inspection result displayed in the other parcel information 89 is touched, the external appearance image of the corresponding parcel may be displayed. Thereby, when parcels of a multiple-item group, which include a parcel that requires the secondary inspection and a parcel that does not require the inspection, are supplied, the parcel that has to be unpacked and subjected to the secondary inspection can be understood by inputting the parcel ID of any one of the parcels of the multiple-item group.

In addition, the processor 61 determines whether the parcel is a parcel of a multiple-item group, based on the information acquired from the second database 16 (ST54). For example, based on whether the result of the multiple-item determination is included in the information acquired from the second database 16, the processor 61 determines whether the parcel is a parcel of the multiple-item group (a parcel to be distributed according to the multiple-item determination). When it is determined that the parcel is not a parcel of the multiple-item group (ST54, NO), the processor 61 advances to the process of ST57 to be described later, and the operator is prompted to perform work for unpacking and inspecting the parcel.

When it is determined that the parcel is a parcel of the multiple-item group (ST54, YES), the processor 61 causes the touch panel 56 to display the number of parcels of the multiple-item group (ST55). Further, based on the result of the single-item determination for the parcel, the processor 61 determines whether the secondary inspection (the inspection conducted by actually unpacking the parcel) is necessary for the parcel (ST56). For example, the processor 61 determines that the parcel, which is normal in the single-item determination, does not require the secondary inspection. In addition, the processor 61 determines that the parcel, which is abnormal in the single-item determination, requires the secondary inspection.

When it is determined that the secondary inspection is not necessary (ST56, NO), the processor 61 skips the secondary inspection by the unpacking, and advances to the process of ST58 to be described later.

When it is determined that the secondary inspection is necessary (ST56, YES), the processor 61 executes the secondary inspection for the parcel (ST57). In the secondary inspection, the operator unpacks the parcel and confirms the content of the parcel. The operator inputs a confirmation result of the content of the unpacked parcel through the touch panel 56 as the inspection result of the secondary inspection. The processor 61 stops the conveyance of the parcel by the first conveyor 51, and accepts the input of the inspection result by the operator.

When the secondary inspection was executed or when the secondary inspection was skipped, the processor 61 determines whether the inspection for all the parcels of the multiple-item group was finished (ST58). When the processor 61 determines that the inspection for the parcels of the multiple-item group is not finished (ST58, NO), the processor 61 retains the parcel in order to distribute all the parcels of the multiple-item group together (ST59). Specifically, the processor 61 executes the inspection process for the next parcel in the state in which the preceding parcel among the parcels of the multiple-item group is retained.

When the processor 61 determines that the inspection for all the parcels of the multiple-item group was finished (ST58, YES), the processor 61 executes multiple-item determination for the parcels of the multiple-item group (ST60). For example, when even one parcel was determined to be rejected in the secondary inspection for the parcels of the multiple-item group, the processor 61 determines, as the multiple-item determination, that all parcels of the multiple-item group are rejected. On the other hand, when all parcels of the multiple-item group were determined to be normal, the processor 61 determines that all parcels of the multiple-item group are normal in the multiple-item determination.

The processor 61 determines the destination of distribution of the parcels of the multiple-item group, based on the result of the multiple-item determination (ST61). For example, when it is determined in the multiple-item determination that the parcels are normal, the processor 61 determines that the destination of distribution of the parcels of the multiple-item group is the sorter.

On the other hand, when it is determined in the multiple-item determination that the parcels are rejected, the processor 61 determines that the destination of distribution of the parcels of the multiple-item group is the reject accumulation unit. Upon determining the destination of distribution, the processor 61 registers the result of the single-item determination for each parcel of the multiple-item group, the result of the multiple-item determination, and the information indicative of the destination of distribution in the second database 16 (ST62). Upon registering the result of the multiple-item determination in the second database 16, the processor 61 conveys all the parcels of the multiple-item group, including the parcel that is being retained, to the destination of distribution corresponding to the result of the multiple-item determination (ST63).

As described above, as regards the parcels of the multiple-item group, the inspection apparatus of the secondary inspection process system executes the secondary inspection for the parcel which was determined, in the single-item determination, to require the secondary inspection in the primary inspection, executes the multiple-item determination for all parcels such that all parcels of the multiple-item group are distributed to the same destination, and distributes the parcels of the multiple-item group to the destination of distribution corresponding to the result of the multiple-item determination.

In addition, the inspection apparatus of the secondary inspection process system retains each parcel of the multiple-item group until executing the multiple-item determination, and distributes all parcels of the multiple-item group to the same destination of distribution in accordance with the result of the multiple-item determination after the execution of the multiple-item determination. Thereby, in the secondary inspection, too, all parcels of the multiple-item group can be conveyed to the same destination of distribution in accordance with the result of the multiple-item determination.

While certain embodiments of the present invention have been described, these embodiments have been presented by way of example only, and are not intended to limit the scope of the invention. These novel embodiments may be implemented in a variety of other forms, and various omissions, substitutions and changes may be made without departing from the spirit of the inventions. These embodiments and modifications thereof are included in the scope and spirit of the invention, and included in the scope of the inventions of the accompanying claims and their equivalents.

The invention claimed is:

1. An inspection apparatus comprising:
a communication interface configured to acquire results of single-item determination, which are inspection results for individual parcels that are successively conveyed, and number-of-items information for identifying, as one parcel group, a plurality of parcels among the individual parcels; and
a processor configured to identify a plurality of parcels as one parcel group, based on the number-of-items information, configured to determine a result of multiple-item determination, which is an inspection result for the parcel group, based on the results of the single-item determination for the individual parcels included in the parcel group, and configured to distribute the individual parcels included in the parcel group, based on the result of the multiple-item determination.

2. The inspection apparatus of claim 1, wherein
the results of the single-item determination are information indicative of inspection results as to whether a further inspection is necessary for the individual parcels, and
when the results of the single-item determination for the individual parcels included in the parcel group include an inspection result that the further inspection is necessary, the processor determines that the result of the multiple-item determination for the parcel group is that a further inspection is necessary, and executes such control as to distribute the individual parcels included in the parcel group to the further inspection.

3. The inspection apparatus of claim 2, further comprising an upper-level communication interface for accessing a database which stores information relating to the individual parcels, and a multiple-item-group ID that identifies the parcel group and is allocated based on the number-of-items information, by correlating the information relating to the individual parcels and the multiple-item-group ID with parcel IDs which identify the individual parcels,
wherein the processor registers the result of the single-item determination for each of the parcels and the result of the multiple-item determination in the database.

4. The inspection apparatus of claim 3, wherein, when the parcels included in the parcel group are processed, the processor causes a display device to display the multiple-item-group ID through the communication interface.

5. The inspection apparatus of claim 4, wherein, when a parcel having the multiple-item-group ID is processed, the processor causes the display device to display the results of the single-item determination of other parcels having the same multiple-item-group ID through the communication interface.

6. An inspection program executed by a processor of an inspection apparatus comprising a communication interface, the inspection program causing the processor to:
 acquire, via the communication interface, results of single-item determination, which are inspection results for individual parcels that are successively conveyed, and number-of-items information for identifying, as one parcel group, a plurality of parcels among the individual parcels;
 identify a plurality of parcels as one parcel group, based on the number-of-items information;
 determine a result of multiple-item determination, which is an inspection result for the parcel group, based on the results of the single-item determination for the individual parcels included in the parcel group; and
 distribute the individual parcels included in the parcel group, based on the result of the multiple-item determination.

* * * * *